United States Patent [19]

Kageyama et al.

[11] Patent Number: 5,391,689
[45] Date of Patent: Feb. 21, 1995

[54] AROMATIC POLYESTER AND POLYESTER RESIN COMPOSITION

[75] Inventors: Yukihiko Kageyama; Tatsuya Saito; Keiichi Kanaka; Kenji Hijikata, all of Shizuoka, Japan

[73] Assignee: Polyplastics Co., Ltd., Osaka, Japan

[21] Appl. No.: 98,075

[22] Filed: Jul. 28, 1993

[30] Foreign Application Priority Data

Jul. 31, 1992 [JP] Japan .................................. 4-204992

[51] Int. Cl.6 ............................................. C08G 63/02
[52] U.S. Cl. .................................... 528/193; 528/176; 528/194
[58] Field of Search ......................... 528/176, 193, 194

[56] References Cited

U.S. PATENT DOCUMENTS

| | | | |
|---|---|---|---|
| 4,067,852 | 1/1978 | Calundann | 528/190 |
| 4,083,829 | 4/1978 | Calundann et al. | 528/176 |
| 4,219,461 | 8/1980 | Calundann | 528/173 |
| 4,375,530 | 3/1983 | Hay et al. | 524/605 |
| 4,436,894 | 3/1984 | Urasaki et al. | 528/176 |
| 4,473,682 | 9/1984 | Calundann et al. | 524/605 |
| 4,864,013 | 9/1989 | Kageyama et al. | 528/220 |
| 5,015,722 | 5/1991 | Charbonneau et al. | 528/190 |
| 5,049,643 | 9/1991 | Kageyama et al. | 528/194 |
| 5,183,878 | 2/1993 | Kanaka et al. | 528/193 |

Primary Examiner—John Kight, III
Assistant Examiner—Terressa Mosley
Attorney, Agent, or Firm—Burns, Doane, Swecker & Mathis

[57] ABSTRACT

A novel wholly aromatic polyester capable of forming an anisotropic melt phase is provided. Such polyester has been demonstrated to be capable of forming quality molded articles having a combination of excellent heat resistance and mechanical properties. The resulting polyester further is capable of readily being melt processed while using conventional equipment. Four essential recurring units are present in the polyester of the present invention wherein (I) is derived from 2,6-naphthalenedicarboxylic acid and/or 4,4'-biphenyldicarboxylicacid; (II) is derived from another dicarboxylic acid (as defined) such as terephthalic acid; and (III) is derived from aromatic diols (as defined) such as 1,4-dihydroxybenzene and 4,4'-dihydroxybiphenyl; and (IV) is derived from another aromatic diol (as defined), such as 4,4'-dihydroxydiphenyl ether. In a preferred embodiment, an inorganic filler is dispersed therein. Molded articles exhibiting highly satisfactory tensile strengths, tensile elongations, and tensile moduli are made possible when melt processing the wholly aromatic polyester.

23 Claims, No Drawings

AROMATIC POLYESTER AND POLYESTER RESIN COMPOSITION

The present invention relates to a new optically anisotropic copolyester which can be melt-processed with conventional equipment to form moldings having excellent heat resistance and mechanical properties.

BACKGROUND OF THE INVENTION

Recently high-performance polymers are demanded by the market. Although liquid-crystal polymers having specific properties such as optical anisotropy, satisfy the demands of the market under these circumstances, they sometimes have problems in that the melting points are excessively high due to their molecular chain structures and they tend to be economically expensive, since special monomers are to be used for producing them.

In particular, wholly aromatic polyesters now available on the market are mainly formed from hydroxy acids, particularly p-hydroxybenzoic acid, However, since the melting point of a homopolymer of p-hydroxybenzoic acid is higher than its decomposition point, the melting point must be lowered by copolymerizing it with various components.

A wholly aromatic polyester produced by using 1,4-phenylenedicarboxylic acid, 1,4-dihydroxybenzene, 4,4'-dihydroxybiphenyl, etc., as the comonomer components has a melting point off as high as 350° C. or above which is too high to allow melt-processing with an ordinary apparatus. On tile contrary, although a wholly aromatic polyester produced by using 2,6-naphthalenedicarboxylic acid has a melting point of as low as around 300° C. and excellent properties, a special comonomer component is necessitated for producing it.

As wholly aromatic polyesters produced without using p-hydroxybenzoic acid, ones produced by using a dihydroxyarylene or dicarboxyarylene as the monomer are described in Japanese Patent Publication-A No. 26681/1989. However, these polymers are economically disadvantageous, since a special monomer having a substituent in the aromatic ring is necessitated for lowering the melting point.

SUMMARY OF THE INVENTION

After extensive investigations made for the purpose of solving the above-described problem, the present inventors have found that an optically anisotropic polyester having a low melting point and excellent mechanical properties can be produced without using p-hydroxybenzoic acid and a special comonomer component. The present invention has been completed on the basis of this finding.

Thus, the present invention relates to an aromatic polyester having an optical anisotropy in the molten state consisting essentially of recurring structural units represented by the following general formulae (I), (II), (III) and (IV) in amounts of 5 to 45, 5 to 45, 10 to 49, and 1 to 40 mole percent, respectively, based on the total structural units where:

(I) is 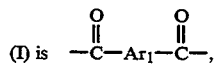

(II) is 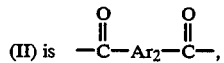

(III) is $-O-Ar_3-O-$, and (IV) is $-O-Ar_4-X-Ar_4-O-$, and wherein $Ar_1$ is selected from the group consisting of 2,6-naphthalene, 4,4'-biphenylene groups, and mixtures thereof; $Ar_2$ is selected from the group consisting of 1,2-phenylene, 1,3-phenylene, 1,4-phenylene groups and mixtures of two or more of these; $Ar_3$ is selected from the group consisting of 1,3-phenylene, 1,4-phenylene groups and a residue of a compound comprising at least two phenylene groups bonded to each other at the p-position, and $Ar_4$ represents 1,4-phenylene, and X represents at least one of

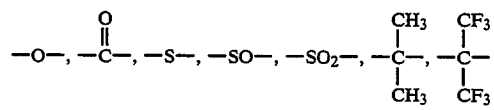

and $-(O(CH_2)_nO)-$ (n being 2 to 6).

To obtain the above-described structural units (I) to (IV), usual ester-forming compounds are usable.

DESCRIPTION OF PREFERRED EMBODIMENTS

Now a detailed description will be made on the starting compounds for forming the aromatic polyesters constituting the present invention in order.

The dicarboxylic acid component comprises two structural units (I) and (II). The structural unit (I) is derived from one or two kinds of 2,6-naphthalenedicarboxylic acid and 4,4'-biphenylenedicarboxylic acid. The amount of the structural unit (I) is 5 to 45% by mole, preferably 7 to 86% by mole, based on all the structural units of the polymer. When the amount of the structural unit (I) is outside this range, the melting point of the resultant polymer is seriously raised and no satisfactory molecular weight can be easily obtained.

The dicarboxylic acid structural unit (II) is derived from one or more kinds of 1,2-phenylenedicarboxylic acid, 1,8-phenylenedicarboxylic acid and 1,4-phenylenedicarboxylic acid. The amount of the structural unit (II) is 5 to 4% by mole based on all the structural units of the polymer. When the amount of the structural unit (II) is outside this range, the melting point of the resultant polymer is seriously raised and the molecular weight is lowered unfavorably.

To introduce the dicarboxylic acid unit into the polymer, a dicarboxylic acid or another diesterforming derivative is usable, the dicarboxylic acid being preferred.

The diol component comprises two structural units (III) and (IV). In these structural units, the unit (III) is derived from one or more kinds of 1,3-dihydroxybenzene, 1,4-dihydroxybenzene and compounds having at least two phenylene groups bonded to each other at the p-position (such as 4,4'-dihydroxybiphenyl and dihydroxyterphenyls such as 4,4'-dihydroxyterphenyl), preferably from a combination of 1,4-dihydroxybenzene with a dihydroxyaryl compound other than 1,4-dihydroxybenzene. The amount of the structural unit (III) is 10 to 49% by mole based on all the structural units of the polymer. When the amount of the structural unit (III) is below 10% by mole based on all the structural units, the melting point is seriously raised and the molecular weight is lowered unfavorably.

The diol constituting unit (IV) represented by the above formula is derived from one or more kinds of 4,4'-dihydroxydiphenyl ether, 4,4'-dihydroxybenzophenone, 4,4'-dihydroxydiphenyl sulfide 4,4'-dihydroxydiphenyl sulfoxide, 4,4'-dihydroxydiphenyl sulfone, 4,4'-dihydroxydiphenylpropane, 4,4'-dihydroxydiphenylhexafluoropropane and 1,2-bis-)phenoxy)alkylene-4,4'-diols. The amount of the structural unit (IV) is 1 to 40% by mole based on all the structural units. When the amount of the structural unit (IV) is outside this range, the melting point of the resultant polymer is seriously raised and the molecular weight is lowered unfavorably.

To introduce the above-described diol units into the polymer, the diols and other diester-forming derivatives such as diacetates, dipropionates and dibenzoates are usable.

The aromatic polyester of the present invention is produced by direct polymerization or transesterification. The polymerization is conducted usually by solvent polymerization or slurry polymerization. Melt polymerization can be used also.

Various catalysts can be used in the polymerization. They are typified by dialkyltin oxides, diaryltin oxides, titanium dioxide, alkoxytitanium silicates, titanium alcoholates and Lewis acid salts such as alkali and alkaline earth metal salts of carboxylic acids and $BF_3$.

The amount of the catalyst is usually about 0.001 to 1% by weight, particularly about 0.01 to 0.2% by weight, based on all the monomers.

The molecular weight of the polymer thus produced by the above-described polymerization method can be further increased by solid phase polymerization wherein the polymer is heated under reduced pressure or in an inert gas.

The fact that the polymer of the present invention is a liquid crystal polymer having an optical anisotropy in a molten state is an indispensable condition for obtaining high heat stability and good processability. The optical anisotropy in a molten state can be confirmed by an ordinary polarimetric method with crossed nicols. In particular, the optical anisotropy in a molten state can be confirmed by melting a sample on a hot stage (mfd. by Linkam Co.) and observing it under a polarizing microscope (mfd. by Olympus Optical Co., Ltd.) at ×150 magnification in a nitrogen atmosphere. The above-described polymer is optically anisotropic and transmits light when it is sandwiched between crossed nicols. When the sample is optically anisotropic, the polarized light is transmitted even when it is in, for example,.a molten stationary liquid state.

As a measure of the processability in the present invention, liquid crystallinity and melting point (liquid crystallinity developing temperature) may be employed. The development of liquid crystallinity highly depends on the fluidity of a molten sample, and it is indispensable that the polyester of the present application develops liquid crystallinity in a molten state.

Since the viscosity of a nematic liquid-crystal polymer is seriously reduced above its melting point, the development of liquid crystallinity at the melting point or above usually serves as a measure of the processability of the polymer. From the viewpoint of heat resistance, it is preferable that the melting point (liquid crystallinity developing temperature) be as high as possible. However, taking the thermal deterioration of a polymer during melt processing and the heating capacity of a molding machine into consideration, the melting point is desirably 350° C. or below. The melt viscosity of a resin is preferably $1 \times 10^6$ P or less, still preferably $10^4$ P or less, above a temperature of at least 10° C. higher than the melting point under a shear stress of 1000 $sec^{-1}$. Such a melt viscosity is generally realized when a polymer is endowed with liquid crystallinity.

The polyester of the present invention may contain various fibrous, powdery, granular or flaky inorganic or organic fillers depending on the purpose of use.

The fibrous fillers include inorganic fibrous materials such as fibers of glass, asbestos, silica, silica/alumina, alumina, zirconia, boron nitride, silicon nitride, boron, and potassium titanate, and fibers of metals such as stainless steel, aluminum, titanium, copper and brass. A particularly preferred fibrous filler is glass fiber. High-melting organic fibrous substances such as polyamides, fluororesins, polyester resins and acrylic resins are also usable.

The powdery or granular fillers include carbon black; graphite; quartz powder; glass; bead; milled glass fiber; glass balloons;glass powder; silicates such as calcium silicate, aluminum silicate, kaolin, talc, clay, diatomaceous earth and wollastonite; metal oxides such as iron oxide, titanium oxide, zinc oxide, antimony trioxide and alumina; metal carbonates such as calcium carbonate and magnesium carbonate; metal sulfates such as calcium sulfate and barium sulfate; ferrite; silicon carbide; silicon nitride; boron nitride; and metal powders.

The flaky fillers include mica, glass flakes and metal foils.

Examples of the organic fillers include heat-resistant high-strength synthetic fibers such as aromatic polyester fibers, liquid-crystalline polymer fibers, and aromatic polyamide and polyimide fibers.

These inorganic and organic fillers are usable either singly or in combination of two or more of them. A combination of the fibrous filler with the granular or flaky filler is preferred particularly for obtaining high mechanical strength and dimensional accuracy, electric properties. etc. The amount of the inorganic filler is 95% by weigh% or below, preferably 1 to 80% by weight, based on the whole composition.

These fillers are desirably used in combination with a binder or surface treatment, if necessary.

The polyester of the present invention may contain other auxiliary thermoplastic resins in such an among as not to impair the object of the present invention.

Examples of the thermoplastic resins thus usable herein include polyolefins such as polyethylene and polypropylene, aromatic polyesters comprising an aromatic dicarboxylic acid and a diol such as polyethylene terephthalate and polybutylene terephthalate, polyacetals (homo- and copolymers), polystyrene, polyvinyl chloride, polyamides, polycarbonates, ABS, polyphenylene oxide. polyphenylene sulfide and fluororesins. These thermoplastic resins are usable also in the form of a mixture of two or more of them.

The aromatic polyester and the composition thereof according to the present invention comprising the specified structural units and having anisotropy in a molten stage have a high fluidity in a molten state and an excellent thermal stability and, in addition, it can be molded at a temperature which is not so high. Therefore, they can be molded into various three-dimensional moldings, fibers and films by injection molding, extrusion molding or compression molding.

Since these aromatic polyesters and compositions have well-balanced thermal stability, they are suitable for use as the material of precision parts, particularly connectors having a narrow pitch, thin parts, electric wire coating materials, etc.

The following Examples will further illustrate the present invention, which by no means limit the invention.

EXAMPLE 1

As shown in Table 1, 89.50 g (25% by mole) of 2,6-naphthalenedicarboxylic acid, 68.77 g (25% by mole) of terephthalic acid, 51.05 g (28% by mole) of 1,4-dihydroxybenzene, 37.00 g (12% by mole) of 4,4'-dihydroxybiphenyl, 33.48 g (10% by mole) of 4,4'-dihydroxydiphenyl ether, 174.28 g of acetic anhydride and 0.05% by weight, based on the total feed, of potassium acetate were fed into a reactor provided with a stirrer, nitrogen-inlet tube and distillation tube. After purging the reactor with nitrogen, the resultant mixture was reacted at 140° C. For 1 h. Then the temperature was gradually elevated to 250° C. during a period of 1.5 h. During this period, about 100 g of acetic acid was distilled off. The temperature was gradually elevated from 250° C. to 300° C. during a period of 1.5 h and then to 340° C. during 1 h. The reaction mixture was stirred at 340° C. for 0.5 h. More than 90% of the theoretical amount of acetic acid distillate had been distilled off by then. Thereafter, the pressure in the reactor was slowly reduced to 20 mmHg at 340° C. after 0.5 h and then to 1 mmHg or below after additional 0.2 h. The reaction was conducted under this pressure for 1 h. A small amount of acetic acid was distilled off during the pressure reduction. After the completion of the reaction, nitrogen was blown into the reactor and the contents were taken out. The resultant polymer was pale yellowish milk white and had a melting point of 294° C. as determined with DSC (mfd. by Perkin-Elmer Corporation). The polymer was heated and observed under crossed nicols on a hot stage (mfd. by Linkam Co.) under a polarizing microscope mfd. by Olympus Optical Co. to find a nematic liquid crystal pattern at the melting point or above. The melt viscosity of the polymer was 780 P (320° C., 1000 sec$^{-1}$) as determined with a Capirograph (mfd. by Toyo Seiki Seisaku-Sho).

Then tensile test pieces were prepared from this polymer on a Mini Shot 2 machine (mfd. by Tsubaco Yokohama Co., Ltd.) and tested with a tensile tester mfd. by Toyo Baldwin Co., Ltd. to find that they have a tensile strength of 1630 kg/cm$^2$, a tensile elongation of 2.0% and a tensile modulus of $7.9 \times 10^4$ kg/cm$^2$.

EXAMPLES 2 TO 10

The polymerization was conducted in the same manner as that of Example 1 except that the proportion of the constituents was altered as specified in Table 1, and the resultant polymer was evaluated also in the same manner as that of Example 1 except that the melting point was determined with a melting point apparatus mfd. by Yanagimoto Mfg. Co., Ltd., since the data obtained with DSC were unreliable because of a small quantity of heat transfer depending on the proportion of the constituents.

EXAMPLE 11

The polymer obtained in Example 1 was mixed with 30% by weight of glass fibers and extruded on an extruder mfd. by Haake Buchler Instruments Inc., and the test pieces were prepared therefrom in the same manner as that of Example 1 and evaluated.

The test results are summarized in Table 1.

Comparative Examples 1 to 4

Polymerization was conducted in the same manner as that of Example 1 except that the proportion of the constituents was altered as specified in Table 2, but the viscosity of the reaction mixture began to seriously increase at around 300° C. When the temperature was elevated finally to 390° C., the reaction mixture was solidified and could not be taken out of the reactor.

The test results are summarized in Table 2.

TABLE 1

| Ex. | Monomer compn. (% by mole) | | | | | | | | Tm (°C.) | Melt viscosity (P) | Tensile strength (kg/cm$^2$) | Tensile elongation (%) | Tensile modulus (kg/cm$^2$) |
|---|---|---|---|---|---|---|---|---|---|---|---|---|---|
| | (I) | | (II) | | (III) | | (IV) | | | | | | |
| 1 | NDA | 25 | TPA | 25 | HQ 28 BP 12 | | DHDPE | 10 | 294 | 750 | 1630 | 2.0 | $7.9 \times 10^4$ |
| 2 | NDA | 25 | TPA | 25 | HQ 28 BP 12 | | DHBP | 10 | 333 | 360 | 1750 | 1.8 | $9.2 \times 10^4$ |
| 3 | NDA | 25 | TPA | 25 | HQ 28 BP 12 | | DHDPSO$_2$ | 10 | 312 | 1500 | 1210 | 2.0 | $7.1 \times 10^4$ |
| 4 | NDA | 25 | TPA | 25 | HQ 28 BP 12 | | DHDPP | 10 | 278 | 3100 | 1370 | 2.7 | $7.3 \times 10^4$ |
| 5 | NDA | 25 | TPA | 25 | HQ 28 BP 12 | | DHDPPF | 10 | 267 | 3800 | 1160 | 3.1 | $6.8 \times 10^4$ |
| 6 | BPDA | 30 | IPA | 20 | HQ 20 BP 20 | | DHDPE | 10 | 273 | 830 | 1350 | 2.3 | $7.2 \times 10^4$ |
| 7 | BPDA | 20 | IPA | 30 | HQ 20 BP 20 | | DHDPE | 10 | 335 | 560 | 1710 | 2.0 | $7.7 \times 10^4$ |
| 8 | NDA | 25 | TPA | 25 | HQ 35 | | DHDPE | 15 | 325 | 670 | 1580 | 1.8 | $7.5 \times 10^4$ |
| 9 | BPDA | 25 | TPA | 25 | HQ 25 | | DHDPE | 25 | 332 | 890 | 1430 | 1.9 | $8.1 \times 10^4$ |
| 10 | BPDA | 25 | TPA | 25 | BP 25 | | DHDPE | 25 | 341 | 910 | 1590 | 2.0 | $7.9 \times 10^4$ |
| 11 | mixture of polymer of Example 1 with 30% by wt. of glass fibers. | | | | | | | | — | — | 1850 | 1.8 | $8.5 \times 10^4$ |

TABLE 2

| Comp. | Monomer compn. (% by mole) | | | | Tm (°C.) | Melt viscosity (P) | Tensile strength (kg/cm$^2$) | Tensile elongation (%) | Tensile modulus (kg/cm$^2$) |
|---|---|---|---|---|---|---|---|---|---|
| | (I) | (II) | (III) | (IV) | | | | | |

TABLE 2-continued

| | Monomer compn. (% by mole) | | | | Tm (°C.) | Melt viscosity (P) | Tensile strength (kg/cm²) | Tensile elongation (%) | Tensile modulus (kg/cm²) |
|---|---|---|---|---|---|---|---|---|---|
| | (I) | (II) | (III) | (IV) | | | | | |
| Ex. | | | | | | | | | |
| 1 | — | TPA 25 | HQ 28 BP 12 | DHDPE 10 | N/A | N/A | N/A | N/A | N/A |
| 2 | NDA 50 | — | HQ 28 BP 12 | DHDPE 10 | N/A | N/A | N/A | N/A | N/A |
| 3 | BPDA 25 | TPA 25 | — | DHDPE 50 | N/A | N/A | N/A | N/A | N/A |
| 4 | BPDA 25 | TPA 25 | BP 50 | — | N/A | N/A | N/A | N/A | N/A |

(Note to Tables 1 and 2)
*NDA: 2,6-naphthalenedicarboxylic acid,
BPDA: 4,4'-biphenyldicarboxylic acid,
TPA: terephthalic acid,
IPA: isophthalic acid,
HQ: 1,4-dihydroxybenzene (1,4-phenylenediol),
BP: 4,4'-dihydroxybiphenyl,
DHDPE: 4,4'-dihydroxydiphenyl ether,
DHBP: 4,4'-dihydroxybenzophenone,
DHDPP: bisphenol A,
DHDPSO$_2$: 4,4'-dihydroxydiphenyl sulfone,
DHDPPF: 4,4'-dihydroxydiphenylhexafluoropropane,
N/A: solidifed and could not be taken out of the reactor.

We claim:

1. An aromatic polyester capable of forming an anisotropic melt phase consisting essentially of recurring structural units represented by the following general formulae (I), (II), (III) and (IV), in amounts of 20 to 30, 20 to 30, 25 to 40, and 10 to 25 mole percent, respectively, based on all the structural units present therein wherein:

(I) is 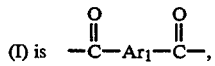

(II) is 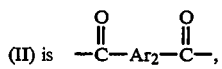

(III) is 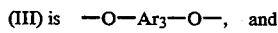, and (IV) is 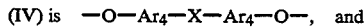, and wherein Ar$_1$ is selected from the group consisting of 2,6-naphthalene, 4,4'-biphenylene groups, and mixtures of the foregoing; Ar$_2$ is selected from the group consisting of 1,2-phenylene, 1,3-phenylene, 1,4-phenylene groups and mixtures of two or more of the foregoing; Ar$_3$ is selected from the group consisting of 1,3-phenylene, 1,4-phenylene groups and a residue of a compound comprising at least two phenylene groups bonded to each other at the p-position; and Ar$_4$ represents 1,4-phenylene, and X represents at least one of

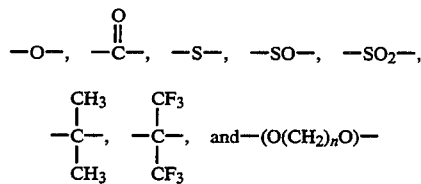

wherein n ranges from 2 to 6.

2. An aromatic polyester according to claim 1 which is capable of forming an anisotropic melt phase at a temperature below 350° C.

3. An aromatic polyester according to claim 1 which is capable of forming an anisotropic melt phase at a temperature below 300° C.

4. An aromatic polyester capable of forming an anisotropic melt phase according to claim 1 which exhibits a melt viscosity of $1 \times 10^6$ P. or less at a shear stress of 1000 sec$^{-1}$.

5. An aromatic polyester capable of forming an anisotropic melt phase according to claim 1 which exhibits a melt viscosity of $1 \times 10^4$ P. or less at a shear stress of 1000 sec$^{-1}$.

6. An aromatic polyester according to claim 1 wherein said anisotropic melt phase is exhibited at a temperature below 350° C., and a melt viscosity of $1 \times 10^6$ P. or less at a shear stress of 1000 sec$^{-1}$.

7. An aromatic polyester according to claim 1 wherein said anisotropic melt phase is exhibited at a temperature below 300° C., and a melt viscosity of $1 \times 10^4$ P. or less at a shear stress of 1000 sec$^{-1}$.

8. An aromatic polyester capable of forming an anisotropic melt phase according to claim 1 wherein the recurring units of (I) are derived from 2,6-naphthalenedicarboxylic acid.

9. An aromatic polyester capable of forming an anisotropic melt phase according to claim 1 wherein the recurring units of (I) are derived from 4,4'-biphenyldicarboxylic acid.

10. An aromatic polyester capable of forming an anisotropic melt phase according to claim 1 wherein the recurring units of (II) are derived from terephthalic acid.

11. An aromatic polyester capable of forming an anisotropic melt phase according to claim 1 wherein the recurring units of (III) are derived from 1,4-dihydroxybenzene.

12. An aromatic polyester capable of forming an anisotropic melt phase according to claim 1 wherein the recurring units of (III) are derived from 4,4'-dihydroxybiphenyl.

13. An aromatic polyester capable of forming an anisotropic melt phase according to claim 1 wherein the recurring units of (III) are derived from 1,4-dihydroxybenzene and 4,4'-dihydroxybiphenyl.

14. An aromatic polyester capable of forming an anisotropic melt phase according to claim 1 wherein the recurring units of (IV) are derived from 4,4'-dihydroxydiphenyl ether.

15. An aromatic polyester capable of forming an anisotropic melt phase according to claim 1 wherein units (I) are present in a concentration of approximately 25 mole percent, units (II) are present in a concentration of approximately 25 mole percent, units (III) are present in a concentration of approximately 40 mole percent, and units (IV) are present in a concentration of approximately 10 mole percent.

16. An aromatic polyester capable of forming an anisotropic melt phase according to claim 1 that includes an inorganic filler dispersed therein in a concentration of no more than 95 percent by weight based upon the total weight of the resulting composition.

17. An aromatic polyester capable of forming an anisotropic melt phase according to claim 1 that includes an inorganic filler dispersed therein in a concentration of approximately 1 to 80 percent by weight based upon the total weight of the resulting composition.

18. An aromatic polyester capable of forming an anisotropic melt phase according to claim 1 that includes glass fibers dispersed therein in a concentration of 30 percent by weight based upon the total weight of the resulting composition.

19. An aromatic polyester capable of forming an anisotropic melt phase according to claim 15 wherein units (II) are derived from terephthalic acid.

20. An aromatic polyester capable of forming an anisotropic melt phase according to claim 19 wherein units (III) are derived from 1,4-dihydroxybenzene and 4,4'-dihydroxybiphenyl, with said units derived from 1,4-dihydroxybenzene being present in a concentration of 28 mole percent and said units derived from 4,4'-dihydroxybiphenyl being present in a concentration of 12 mole percent.

21. An aromatic polyester capable of forming an anisotropic melt phase according to claim 1 wherein units (III) are derived from 1,4-dihydroxybenzene and 4,4'-dihydroxybiphenyl, with said units derived from 1,4-dihydroxybenzene being present in a concentration of 20 mole percent and said units derived from 4,4'-dihydroxybiphenyl being present in a concentration of 20 mole percent.

22. An aromatic polyester capable of forming an anisotropic melt phase according to claim 1 wherein units (II) are derived from terephthalic acid and said units (III) are derived from 4,4'-dihydroxybiphenyl.

23. An aromatic polyester capable of forming an anisotropic melt phase according to claim 1 wherein units (II) are derived from terephthalic acid and units (III) are derived from 4,4'-dihydroxybiphenyl, and each of units (I), (II), (III) and (IV) is present in a concentration of 25 mole percent.

* * * * *